(12) United States Patent
Lee et al.

(10) Patent No.: US 7,319,773 B2
(45) Date of Patent: Jan. 15, 2008

(54) SUBMINIATURE BONE VIBRATING SPEAKER USING THE DIAPHRAGM AND MOBILE PHONE THEREBY

(75) Inventors: Oug-Ki Lee, A/12 Green Villa, 1-5, Hang-dong, Guro-gu, Seoul (KR) 152-140; Joo-Bae Kim, 285, Kogang-1-dong, Ohjung, Bucheon-shi, Kyunggi-do (KR) 421-800

(73) Assignees: Phicom Corporation, Seoul (KR); Oug-Ki Lee, Seoul (KR); Olewolff Uniwell Acoustics Co., Ltd., Kyunggi-Do (KR); Joo-Bae Kim, Kyunggi-Do (KR)

( * ) Notice: Subject to any disclaimer, the term of this patent is extended or adjusted under 35 U.S.C. 154(b) by 129 days.

(21) Appl. No.: 10/524,709

(22) PCT Filed: Mar. 19, 2003

(86) PCT No.: PCT/KR03/00542

§ 371 (c)(1),
(2), (4) Date: Feb. 14, 2005

(87) PCT Pub. No.: WO2004/017532

PCT Pub. Date: Feb. 26, 2004

(65) Prior Publication Data

US 2006/0165246 A1 Jul. 27, 2006

(30) Foreign Application Priority Data

Aug. 16, 2002 (KR) ............... 10-2002-0048318

(51) Int. Cl.
*H04R 25/00* (2006.01)
(52) U.S. Cl. .................... 381/380; 381/326
(58) Field of Classification Search ......... 381/326, 381/380, FOR. 130, 68.4, 151, FOR. 127, 381/117, 152, 337, 396, 318, 93, 94.1; 379/433.02, 379/430; 600/25

See application file for complete search history.

(56) References Cited

U.S. PATENT DOCUMENTS 2,077,425 A * 4/1937 Lieber ..................... 381/151

(Continued)

FOREIGN PATENT DOCUMENTS

JP        58182398 A * 10/1983

(Continued)

OTHER PUBLICATIONS

John Borwick, "Loudspeaker and Headphone Handbook",2001, Reed Educational and Professional Publishing, third Edition.*

(Continued)

*Primary Examiner*—Brian Ensey
(74) *Attorney, Agent, or Firm*—Daly, Crowley, Mofford & Durkee, LLP

(57) ABSTRACT

The present invention relates to a subminiature bone conduction speaker by using a vibrating plate and a mobile phone having the subminiature bone conduction speaker. A subminiature bone conduction speaker using a vibrating plate according to the present invention comprises a body having a shape of a cylinder of which upper portion is opened; yoke which is disposed in a lower portion of the body and of which center has a protrusion; a ring type magnet which is formed on the edge of the yoke and apart from an end portion of the protrusion by a predetermined clearance; an upper plate which is formed on the magnet; a mastoid which is contacted to bone conduction of a user and by which vibration is transmitted to the user; an acoustic vibrating plate which is inserted at a lower side of the mastoid to cover the opening portion of the body and which is made of an elastic material; an auxiliary vibrating plate which is inserted under the acoustic vibrating plate which is inserted to the mastoid; a voice coil which is attached to the auxiliary vibrating plate and which is inserted between the end portion of the protrusion of the yoke and the ring type magnet; a front cap for fixing the acoustic vibrating plate on the body; and a electrical signal input unit for inputting an electric signal to the voice coil.

9 Claims, 4 Drawing Sheets

U.S. PATENT DOCUMENTS

| | | | |
|---|---|---|---|
| 6,141,427 A * | 10/2000 | Fukuda | 381/151 |
| 6,483,917 B1 * | 11/2002 | Kang et al. | 379/430 |
| 6,850,138 B1 * | 2/2005 | Sakai | 381/396 |
| 2002/0122563 A1 * | 9/2002 | Schumaier | 381/326 |
| 2003/0012395 A1 * | 1/2003 | Fukuda | 381/380 |

FOREIGN PATENT DOCUMENTS

| | | |
|---|---|---|
| JP | P10-51876 A | 2/1998 |
| WO | WO 02/25989 A1 * | 3/2002 |
| WO | WO 200225989 A1 * | 3/2002 |

OTHER PUBLICATIONS

John Borwick, "Loudspeaker and Headphone Handbook", 2001, Reed Educational and Professional Publishing, $3^{rd}$ ED.*

PCT/KR03/00542 International Search Report.

* cited by examiner

SUBMINIATURE BONE VIBRATING SPEAKER USING THE DIAPHRAGM AND MOBILE PHONE THEREBY

CROSS-REFERENCE TO RELATED APPLICATIONS

This application is a National Stage application under 35 U.S.C. §371 of and claims the benefit of International Application No. PCT/KR03/00542, filed on Mar. 19, 2003, published in the English language on Feb. 26, 2004 as International Publication Number WO 2004/017532 A1, which claims priority to Korean Application No. 10-2002-48318 filed on Aug. 16, 2002, all of which are hereby incorporated by reference.

TECHNICAL FIELD

The present invention relates to a subminiature bone conduction speaker by using a vibrating plate and a mobile phone having the subminiature bone conduction speaker, and more specifically, to a subminiature bone conduction speaker by using a vibrating plate capable of directly vibrating skull bone and stimulating auditory nerve so that sound can be heard and a mobile phone having the subminiature bone conduction speaker.

BACKGROUND ART

Generally, sound that is heard by human beings is a wave. The sound wave that is transmitted to the ears of the human beings vibrates the air molecules within the ears. The movement of the molecules, in turn, vibrates the tympanic membrane, that is, eardrum so that the human beings can hear the sound.

The sound wave enters the external ears of the human beings and is transmitted to the tympanic membrane. The vibration of the tympanic membrane generated by the sound wave is transmitted to the cells of the internal ears, so that the human beings can hear the sound.

The audible frequency in which the human beings can hear the sound is within the range of 20 Hz to 20,000 Hz. The best audible range in the audible frequency range, that is, so called 'communication voice range' is 125 Hz to 8,000 Hz. Commonly, the human beings use the range of 500 Hz to 8,000 Hz for their communication.

Most of the human beings can hear the sound in the range of 20 Hz to 20,000 Hz. However, some of the human beings having auditory disorders such as have disorders of external ears or middle ears, presbycusis which is a hearing loss that gradually occurs as they grow older, and hearing loss as an occupational disease can not hear the sound in the only specific frequency range or over the all frequency range.

A bone conduction telephone and a hearing aid vibrator by using a piezoelectric device which is used for such people having hearing loss are disclosed in the Korean utility model registration No 221534.

The bone conduction telephone and the hearing aid vibrator by using the piezoelectric device according to the utility model in the Korean utility model registration No 221534 comprises the piezoelectric device 100 which generates a physical vibration by an electric voice signal being applied, vibrating plates 110 disposed at both end side of the piezoelectric device 100 which apply the electrical signal to he piezoelectric device 100 through a conducting wire 130, an electrode plate 120, a front contacting portion 140 connected to the vibrating plates 110 which transmits the vibration to the exterior, and a cover which supports and protects the piezoelectric device 100. In the utility model, the piezoelectric device 100 generates a vibration with piezoelectric effect. The generated vibration has a voice frequency corresponding to the electrical voice signal which is applied through the vibrating plates 110 and the electrode plate 120. The generated vibration is transmitted to the exterior as a vibration signal.

However, bone conduction telephone and the hearing aid vibrator by using the piezoelectric device according to the utility model are too theoretical to be implemented. The utility model has so many problems for its commercial implementation. Since the piezoelectric device has high impedance, the output sound pressure is too low and the miniaturization of the products is too difficult.

In order to solve the problems, a bone conduction hearing aid apparatus and a bone conduction telephone that directly vibrate skull bone have bee proposed and developed. In the bone hearing aid apparatus and the bone conduction telephone, the vibration stimulates the auditory nerve and thus the sound can be heard.

The bone conduction speaker which directly vibrates the skull bone and the vibration stimulates the auditory nerve for hearing the sound is disclosed in the Korean patent registration No. 310891 which is registered on Sep. 21, 2001.

The bone conduction speaker disclosed in the Korean patent registration No. 310891 comprises a frame having side wall and lower wall which defines a certain space; a protector of which inner side peripheral portion is combined to upper surface of the side wall and of which center has an opening; a damper for reducing intensities vibration and sound by performing stabilized vibration which is disposed between the upper end of the side wall and the lower surface of the inner side peripheral portion; a main body for supporting the inner side end of the damper which is disposed within the space; an extending portion which is incorporated into the main body and extended downwardly; an yoke for focusing magnetic flux; a magnet which is disposed at the interior of the extending portion and of which upper surface is closely contacted to the lower surface of the main body; a vibration contacting portion which is externally exposed through the opening to directly contacted to head of human beings; a fixing means for fixing the protector, the yoke, the magnet, and the upper plate as one body; and a voice coil which is disposed in the clearance between the upper plate, both ends of the magnet, and the inner surface of the extending portion and of which lower end is fixed to the lower wall.

However, the conventional bone conduction speaker has a problem that high driving voltage and high power consumption are necessary to vibrate the yoke, the magnet, and the upper plate since the yoke, the magnet, and the upper plate serve as parts for generating the magnetic field as well as parts of vibrating upwardly and downwardly.

In addition, in the conventional bone conduction speaker, high strength of the magnetic field is necessary and large sizes of the yoke, the magnet, and the upper plate which are above a specific size are necessary to vibrate the yoke, the magnet, and the upper plate since the yoke, the magnet, and the upper plate serve as parts for generating the magnetic field as well as parts of vibrating upwardly and downwardly.

Therefore, the conventional bone conduction speaker has another problem that it is impossible to miniaturized and be employed to a subminiature mobile phone, a subminiature headset, a hearing aid apparatus, and so on.

Furthermore, in the aforementioned bone conduction speaker, the voice coil is fixed on the base plate and the mastoid, the yoke, the magnet, and the upper plate are vibrated by the magnetic field which is generated by the voice coil. Therefore, the conventional bone conduction speaker has still another problem that it is impossible to transmit the vibration of the mastoid to the user accurately since the mastoid which is contacted to the bone skull of the user is difficult to vibrate upwardly and downwardly due to heavy weights of the mastoid, the yoke, the magnet, and the upper plate.

In addition, the conventional bone conduction speaker has further still another problems that it may be easily being out of order due to any infinitesimal external impacts and its reliability may be being deteriorated since the internal parts such as the yoke and the magnet for generating the magnetic field are disposed at the upper portion of the bone conduction speaker.

DISCLOSURE OF INVENTION

An object of the present invention is to provide a subminiature bone conduction speaker by using a vibrating plate and a mobile phone having the subminiature bone conduction speaker capable of reducing a driving voltage and thus reducing power consumption.

Another object of the present invention is to provide a subminiature bone conduction speaker by using a vibrating plate and a mobile phone having the subminiature bone conduction speaker capable of miniaturizing the associated products and thus being employed to a headset and a telephone such as subminiature mobile phone.

Still another object of the present invention is to provide a subminiature bone conduction speaker by using a vibrating plate and a mobile phone having the subminiature bone conduction speaker capable of freely vibrating and thus directly transmitting the signal sound to a user.

Still another object of the present invention is to provide a subminiature bone conduction speaker by using a vibrating plate and a mobile phone having the subminiature bone conduction speaker capable of resisting external impact by a yoke and a magnet being disposed at a lower portion In order to achieve the above objects, a subminiature bone conduction speaker of the present invention is characterized in that the subminiature bone conduction speaker using a vibrating plate comprises a body having a shape of a cylinder of which upper portion is opened; a yoke which is disposed in a lower portion of the body and of which center has a protrusion; a ring type magnet which is formed on the edge of the yoke and apart from and end portion of the protrusion by a predetermined clearance; an upper plate which is formed on the magnet; a mastoid which is contacted to bone conduction of a user and by which vibration is transmitted to the user; an acoustic vibrating plate which is inserted at a lower side of the mastoid to cover the opening portion of the body and which is made of an elastic material; an auxiliary vibrating plate which is inserted under the acoustic vibrating plate which is inserted to the mastoid; a voice coil which is attached to the auxiliary vibrating plate and which is inserted between the end portion of the protrusion of the yoke and the ring type magnet; a front cap for fixing the acoustic vibrating plate on the body; and a electrical signal input portion for inputting an electric signal to the voice coil.

In the aforementioned bone conduction speaker, it is preferable that a howl-preventing hole is positioned in at least one of the mastoid and the auxiliary vibrating plate.

In the aforementioned subminiature bone conduction speaker, the acoustic vibrating plate may be made of beryllium copper, so that the acoustic vibrating plate can be produced to have thin thickness and the elastic force of the acoustic vibrating plate can be increased. In addition, the ring type magnet may be made of Nd material, so that large intensity of magnet field can be generated by small size of the ring type magnet.

Furthermore, in the electrical signal input unit of the aforementioned subminiature bone conduction speaker, one end and the other end of the voice coil may be connected with an outgoing line, and the outgoing line may be passed through a through hole formed in the body and be connected to a connection terminal formed on an outer side of the body.

In addition, a mobile phone of the present invention is characterized in that the mobile phone has a bone conduction speaker which comprises a body having a shape of a cylinder of which upper portion is opened; a yoke which is disposed in a lower portion of the body and of which center has a protrusion; a ring type magnet which is formed on the edge of the yoke and apart from an end portion of the protrusion by a predetermined clearance; an upper plate which is formed on the magnet; a mastoid which is contacted to bone conduction of a user and by which vibration is transmitted to the user; an acoustic vibrating plate which is inserted at a lower side of the mastoid to cover the opening portion of the body and which is made of an elastic material; an auxiliary vibrating plate which is inserted under the acoustic vibrating plate which is inserted to the mastoid; a voice coil which is attached to the auxiliary vibrating plate and which is inserted between the end portion of the protrusion of the yoke and the ring type magnet; a front cap for fixing the acoustic vibrating plate on the body; and a electrical signal input unit for inputting an electric signal to the voice coil.

BRIEF DESCRIPTION OF THE DRAWINGS

The above and other objects, advantages and features of the present invention will become apparent from the following description of preferred embodiments given in conjunction with the accompanying drawings, in which.

BEST MODE FOR CARRYING OUT THE INVENTION

Now, the preferred embodiments according to the present invention will be described in details with reference to the accompanying drawings.

Figure 1:
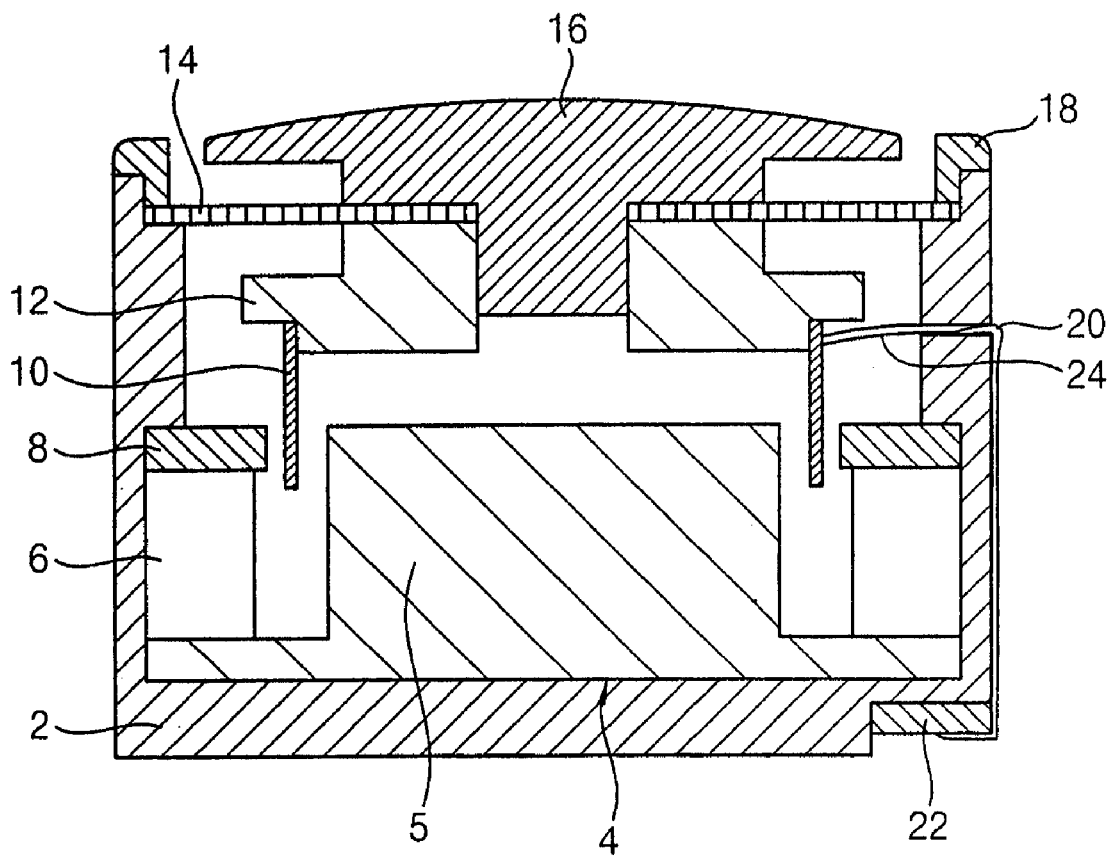
FIG. 1 is a cross sectional view of a subminiature bone conduction speaker according to an embodiment of the present invention.
Figure 2:
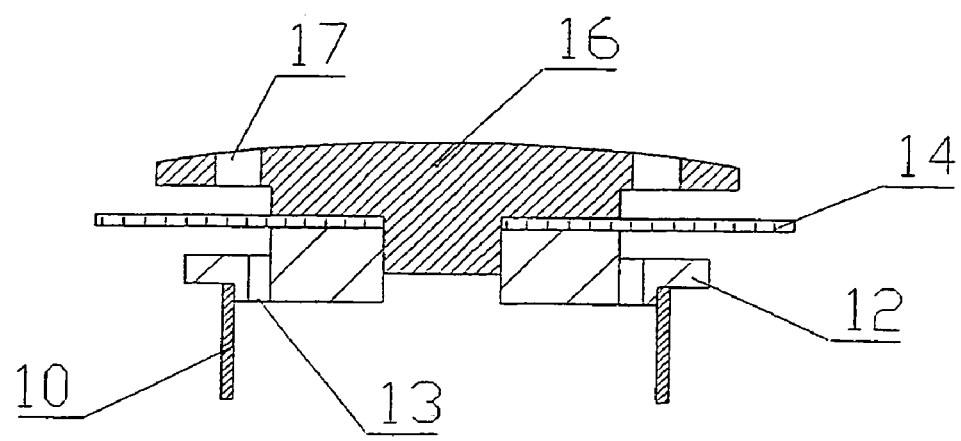
FIG. 2 is an enlarged cross sectional view illustrating a mastoid, an acoustic vibrating plate, an auxiliary vibrating plate, and a voice coil shown in FIG. 1.

FIG. 1 is a cross sectional view of a subminiature bone conduction speaker according to an embodiment of the present invention, and FIG. 2 is an enlarged cross sectional view illustrating a mastoid, an acoustic vibrating plate, an auxiliary vibrating plate, and a voice coil.

The subminiature bone conduction speaker according to the present invention comprises a body 2 which is constructed with a plastic material for sub-miniaturization. The body 2 has a shape of a cylinder with its upper portion opened. A through hole 20 is formed to connect with external portion at the one side wall of the body 2. A connection terminal 22 is formed at the outer bottom portion of the body 2.

The edge of the outer bottom portion of the body has a recess. In the interior of the body, a yoke 4 and a protrusion 5 of the yoke 4 are formed at the center. The Yoke 4 is made of a metal. On the edge of the yoke 4, a ring type magnet 6 is formed so that the ring type magnet 6 is apart from an end portion of the protrusion 5 by a predetermined clearance. The ring type magnet is made of Nd. An upper plate 8 is formed on the ring type magnet. The upper plate 8 is made of a magnetic material.

The body 2, the yoke 4, the ring type magnet 6, and the upper plate 8 are incorporated by well known injection molding technique.

A mastoid 16 which is made of a plastic material is formed on top of the body 2. The lower diameter of the mastoid is smaller than its upper diameter. The acoustic vibrating plate 14 is inserted under the mastoid 16 to cover the top of the body 2. The acoustic vibrating plate 14 is made of beryllium copper. The auxiliary vibrating plate 12 is formed to be inserted to the lower portion of the mastoid 16 under the vibrating plate 14.

The mastoid 16, the acoustic vibrating plate 14, and the auxiliary vibrating plate 12 are engaged by a pressure inserting method. An ultrasonic vibration attachment and a reinforcing attachment by using an adhesive are carried out on the contacting portions of the mastoid 16, the acoustic vibrating plate 14, and the auxiliary vibrating plate 12. And then, a drying process is carried out on the contacting portions for 4 hours.

A voice coil 10 is attached downwardly under the auxiliary vibrating plate 12 by an adhesive of heat-resistant rubber. End portion of the voice coil 10 is placed between the side end portion of the protrusion 5 of the yoke 4 and the side end portion of the ring type magnet 6.

The one end and the other end of the voice coil 10 are connected with an outgoing line 24, of which surface is treated with a coating against its short circuit. The outgoing line 24 is passed through the through hole 20 and connected to the connection terminal 22 with a soldering method. As described above, the connection terminal 22 is formed on the outer bottom portion of the body 2.

In addition, a front cap 18 is disposed on the mastoid 16, the acoustic vibrating plate 14, and the auxiliary vibrating plate 12 which are incorporated into the body 2. The front cap 18 has a function of fixing the mastoid 16, the acoustic vibrating plate 14, and the auxiliary vibrating plate 12.

Now, the structure of the body 2, the mastoid 16, the acoustic vibrating plate 14, and the auxiliary vibrating plate 12 will be described in details with reference to FIG. 2. In the mastoid 16, an upper howling preventing hole 17 is formed to prevent the howling effect at ears of the user. In addition, in the auxiliary vibrating plate 12, a lower howling preventing hole 13 is also formed to prevent the howling effect at the ears of the user.

Figure 3:
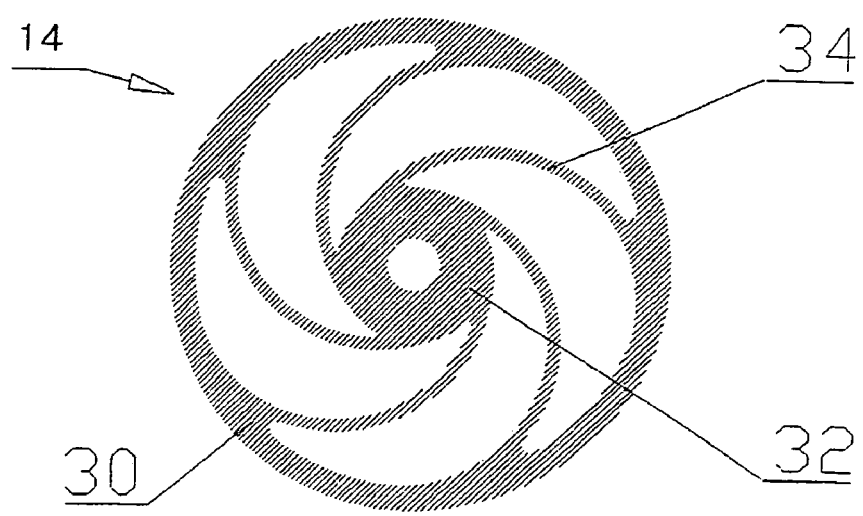
FIG. 3 is a plan view of the acoustic vibrating plate shown in FIG. 1.

As shown in FIG. 3, in the acoustic vibrating plate 14, an internal ring 32 and an outer ring 30 are connected with four connection portions 34 so that the vibration generated by magnetic field of the voice coil 10 can be transmitted to the mastoid 16 accurately.

The acoustic vibrating plate 14 which is made of beryllium copper has such a thin thickness of about 1 mm that it can have a certain elastic force.

By this, construction, when an external sound signal, that is, an electric signal is applied to the connection terminals 22, the electric signal is transmitted through the outgoing line 24 to the voice coil 10.

In accordance with electric signal which is transmitted to the voice coil 10, a certain physical force F is generated between the upper plate 8 on the ring type magnet 6 and the yoke 4. The direction of the physical force F is oscillating upwardly and downwardly in accordance with the Fleming's left hand law. By the physical force F, the voice coil 10 and the auxiliary vibrating plate 12 which is connected to the voice coil 10 are vibrated. This vibration is hereinafter referred to as a 'primary vibration.

The primary vibration of the auxiliary vibrating plate 12 is transmitted to the acoustic vibrating plate 14, so that the acoustic vibrating plate 14 is vibrated. This vibration is hereinafter referred to as a 'secondary vibration.' The secondary vibration of the acoustic vibrating plate 14 is transmitted to the mastoid 16, so that the mastoid 16 is vibrated. This vibration is hereinafter referred to as a 'tertiary vibration.' The tertiary vibration of the mastoid 16 is transmitted through the skull bone of the user to stimulate the auditory nerve. The user can hear the sound by means of the stimulated auditory nerve.

In the above construction, the relatively heavy elements which are the ring type magnet 6, the upper plate 8, and the yoke 4 are disposed at the lower portion of the body 2. On the other hand, the relatively light elements which are the voice coil 10, the auxiliary vibrating plate 12, the acoustic vibrating plate 14, and the mastoid 16 are disposed at the upper portion of the body 2. By doing so, when the voice coil 10, the auxiliary vibrating plate 12, the acoustic vibrating plate 14, and the mastoid 16 are vibrated by the physical force generated in accordance with the Fleming's left hand law, they are able to be vibrated even in a low driving voltage and thus the vibration is able to be transmitted to the user accurately.

The voice coil 10, the auxiliary vibrating plate 12, the acoustic vibrating plate 14, and the mastoid 16 which are the elements vibrated by the physical force F generated by the Fleming's left hand law are so light that they can be driven by a low intensity of magnetic field. Therefore, in accordance with the present invention, it is possible to miniaturize the bone conduction speaker.

In addition, in accordance with the present invention, the ring type magnet 6, the upper plate 8, and the yoke 4 are disposed at the lower portion of the body 2. Therefore, it is possible to prevent these elements from being out of order due to any external impacts.

Figure 4:
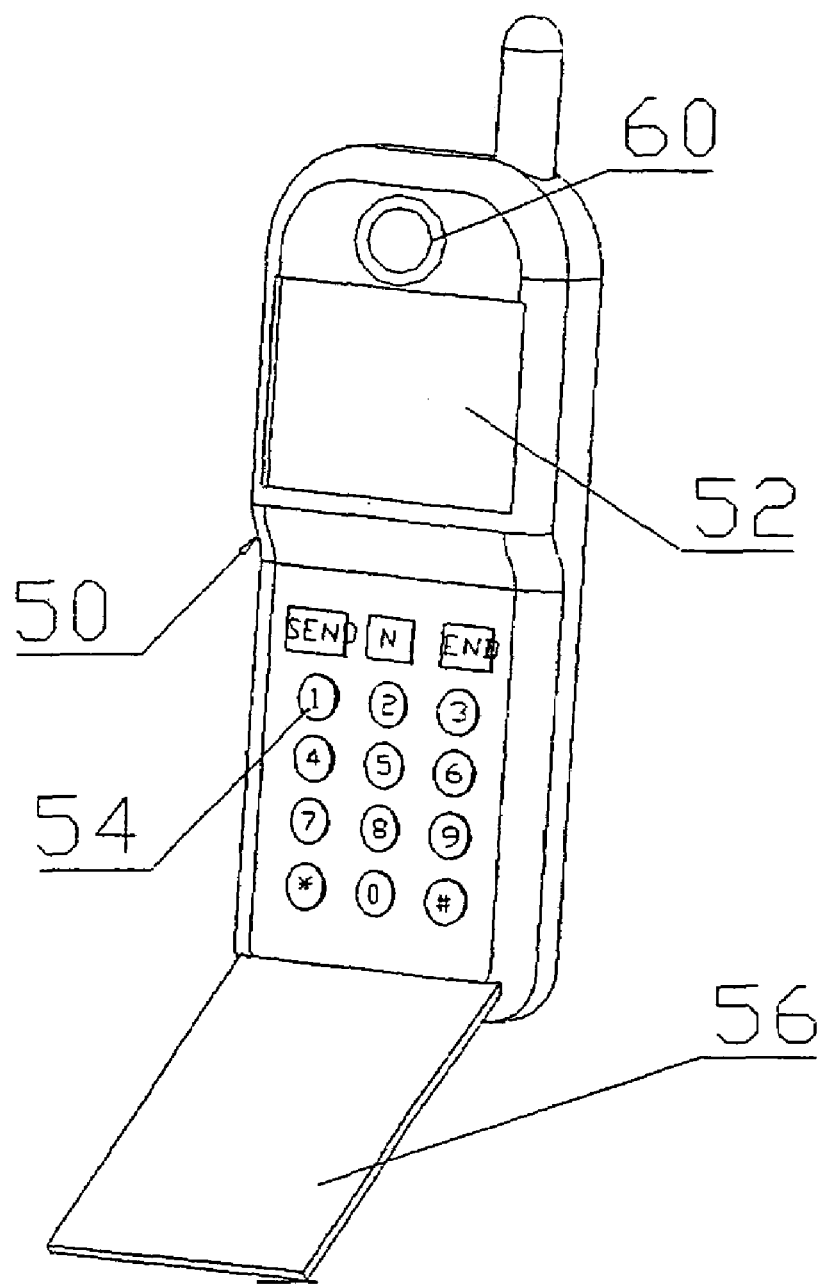
FIG. 4 is a perspective view of a mobile phone to which the bone conduction speaker using a vibrating plate according to the present invention is provided.

FIG. 4 is a perspective view of a mobile phone to which the bone conduction speaker using a vibrating plate according to the present invention is provided.

As shown in FIG. 4, the aforementioned bone conduction speaker 60 according to the present invention is provided at the top portion of the mobile phone 50 which comprises a liquid crystal display unit 52, a numeral portion 54, and a cover 56. By the bone conduction speaker 60, the skull bone of the user of the mobile phone is directly vibrated and the user's auditory nerve is stimulated, so that the user can hear the sound.

According to the present invention, it is advantageous that it is possible to drive the voice coil, the auxiliary vibrating plate, and the mastoid easily in a low driving voltage and to reduce the power consumption for the vibration of the voice coil, the auxiliary vibrating plate, and the mastoid since the substantially vibrating elements are constructed with the voice coil, the auxiliary vibrating plate, and the mastoid of which weights are light.

In addition, it is advantageous that it is possible for the user to hear sound with high quality since weights of the voice coil, the auxiliary vibrating plate, and the mastoid are light.

Furthermore, it is advantageous that it is possible to miniaturize the sizes of the elements such as the voice coil, the auxiliary vibrating plate, the mastoid, and others, and thus to employ the products easily to a subminiature mobile phone, a subminiature headset, a hearing aid apparatus, and so on since the voice coil, the auxiliary vibrating plate, and the mastoid having light weights can be vibrated by a low intensity of a magnet field.

In addition, it is advantageous that it is possible to prevent the bone conduction speaker from being out of order and to prevent reliability of the associated products from being deteriorated due to infinitesimal external impacts since the magnetic field generating elements such as the yoke, the ring type magnet, and the upper plate are formed at the lower portion of the body.

Although the present invention and its advantages have been described in details, it should be understood that the present invention is not limit to the aforementioned embodiment and the accompanying drawings and it should be understood that various changes, substitutions and alterations can be made herein by the skilled in the arts without departing from the sprit and the scope of the present invention as defined by the appended claims.

What is claimed is:

1. A subminiature bone conduction speaker using a vibrating plate comprising:
    a body having a shape of a cylinder of which upper portion is opened;
    a yoke which is disposed in a lower portion of the body and of which center has a protrusion;
    a ring type magnet which is formed on the edge of the yoke and apart from an end portion of the protrusion by a predetermined clearance;
    an upper plate which is formed on the magnet;
    a mastoid to transmit a vibration to a skull of a user for stimulating an auditory nerve of the user;
    an acoustic vibrating plate which is inserted at a lower side of the mastoid to cover the opening portion of the body and which is made of an elastic material;
    an auxiliary vibrating plate which is inserted under the acoustic vibrating plate which is inserted to the mastoid; the auxiliary vibrating plate including a howl-prevention hole, so that a howling effect is prevented at ears of the user;
    a voice coil which is attached to the auxiliary vibrating plate and which is inserted between the end portion of the protrusion of the yoke and the ring type magnet;
    a front cap for fixing the acoustic vibrating plate on the body; and
    an electrical signal input unit for inputting an electric signal to the voice coil.

2. A subminiature bone conduction speaker using a vibrating plate according to claim 1, wherein the howl-prevention hole is positioned in the mastoid, thereby preventing a howling effect at the ears of the user.

3. A subminiature bone conduction speaker using a vibrating plate according to claim 1, wherein the acoustic vibrating plate is made of beryllium copper.

4. A subminiature bone conduction speaker using a vibrating plate according to claim 1, wherein the ring magnet comprises neodymium (Nd).

5. A subminiature bone conduction speaker using a vibrating plate according to claim 1,
    wherein one end and the other end of the voice coil are connected with an outgoing line, and
    wherein the outgoing line is passed through a through hole formed in the body and is connected to a connection terminal formed on an outer side of the body.

6. A mobile phone having a hone conduction speaker, wherein the bone conduction speaker comprising of:
    a body having a shape of a cylinder of which upper portion is opened;
    a yoke which is disposed in a lower portion of the body and of which center has a protrusion;
    a ring type magnet which is formed on the edge of the yoke and apart from an end portion of the protrusion by a predetermined clearance;
    an upper plate which is formed on the magnet;
    a mastoid to transmit a vibration to a skull of a user for stimulating an auditory nerve of the user;
    an acoustic vibrating plate which is inserted at a lower side of the mastoid to cover the opening portion of the body and which is made of an elastic material;
    an auxiliary vibrating plate which is inserted under the acoustic vibrating plate which is inserted to the mastoid; the auxiliary vibrating plate including a howl-prevention hole, so that a howling effect is prevented at ears of the user;
    a voice coil which is attached to the auxiliary vibrating plate and which is inserted between the end portion of the protrusion of the yoke and the ring type magnet;
    a front cap for fixing the acoustic vibrating plate on the body; and
    an electrical signal input unit for inputting an electric signal to the voice coil.

7. A subminiature bone conduction speaker using a vibrating plate according to claim 1, wherein the mastoid comprises a plastic material.

8. A mobile phone having a bone conduction speaker according to claim 6, wherein the mastoid comprises a plastic material.

9. A subminiature bone conduction speaker using a vibrating plate, comprising:
    a body having a shape of a cylinder of which an upper portion is opened;
    a magnet positioned at a lower portion of the body;
    a mastoid positioned at the upper portion of the body, an upper face of the mastoid having a size larger than a central portion of the magnet to thereby transmit a vibration to a skull of a user for stimulating an auditory nerve of the user;
    an acoustic vibrating plate which is inserted at a lower side of the mastoid to cover the opened upper portion of the body and which is made of an elastic material;
    an auxiliary vibrating plate which is inserted under the acoustic vibrating plate which is inserted to the mastoid, the auxiliary vibrating plate including a howl-prevention hole, so that a howling effect is prevented at ears of the user;
    a voice coil spaced apart from the magnet by an interval distance, the voice coil being vibrated by an electromagnetic force due to the magnet and an electrical signal applied thereto; and
    an electrical signal line unit for inputting the electrical signal to the voice coil.

* * * * *